United States Patent
Brown et al.

(10) Patent No.: US 8,545,125 B2
(45) Date of Patent: Oct. 1, 2013

(54) NON-PARALLEL SPLINED HUB AND SHAFT CONNECTION

(75) Inventors: Donn J. Brown, Broken Arrow, OK (US); Brown L. Wilson, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 187 days.

(21) Appl. No.: 12/475,685

(22) Filed: Jun. 1, 2009

(65) Prior Publication Data

US 2010/0303537 A1 Dec. 2, 2010

(51) Int. Cl.
*B25G 3/28* (2006.01)

(52) U.S. Cl.
USPC ........................................... 403/359.1

(58) Field of Classification Search
USPC .............................. 403/359.1–359.6; 464/182
See application file for complete search history.

(56) References Cited

U.S. PATENT DOCUMENTS

| | | | | |
|---|---|---|---|---|
| 1,381,805 A * | 6/1921 | Crewdson | ................... | 403/359.1 |
| 1,803,995 A * | 5/1931 | Chilton | ................... | 403/359.6 |
| 2,038,554 A * | 4/1936 | Edgar | ................... | 403/359.5 |
| 2,297,390 A * | 9/1942 | Burger | ................... | 403/350 |
| 3,073,134 A | 1/1963 | Mann | | |
| 3,222,772 A * | 12/1965 | Leyner | ................... | 29/447 |
| 3,360,961 A * | 1/1968 | Steiner | ................... | 464/158 |
| 3,742,656 A * | 7/1973 | Amos | ................... | 451/508 |
| 3,865,500 A * | 2/1975 | Newell | ................... | 403/359.5 |
| 4,115,022 A * | 9/1978 | Orain | ................... | 403/359.6 |
| 4,133,516 A | 1/1979 | Jurgens | | |
| 4,331,006 A | 5/1982 | Bishop | | |
| 5,533,825 A * | 7/1996 | Stone | ................... | 403/359.6 |
| 5,660,494 A * | 8/1997 | Schwarzler et al. | ........ | 403/359.6 |
| 6,050,346 A | 4/2000 | Hipp | | |
| 6,056,051 A | 5/2000 | Coronado | | |
| 6,056,511 A | 5/2000 | Kennedy et al. | | |
| 6,120,261 A | 9/2000 | Al-Towailib | | |
| 6,126,416 A | 10/2000 | Lee | | |
| 6,332,841 B1 | 12/2001 | Secord | | |
| 6,547,479 B2 | 4/2003 | Dowling, Jr. et al. | | |
| 6,604,885 B1 * | 8/2003 | Neuner | ................... | 403/359.2 |
| 6,709,234 B2 | 3/2004 | Gilbert et al. | | |
| 6,752,560 B2 | 6/2004 | Wilson et al. | | |
| 7,223,074 B2 * | 5/2007 | Rydberg et al. | ............ | 416/170 R |
| 7,288,029 B1 * | 10/2007 | Lyon et al. | ................... | 464/162 |
| 7,478,969 B2 * | 1/2009 | Kozlowski et al. | ........ | 403/359.6 |
| 2009/0291003 A1 * | 11/2009 | Brown et al. | ................ | 417/410.3 |

OTHER PUBLICATIONS

Southard, Robert, "New Assembly Drills Without Reactive Torque", SPE/IADC 105000, Feb. 2007, 1-7.

* cited by examiner

*Primary Examiner* — Daniel P. Stodola
*Assistant Examiner* — Daniel Wiley
(74) *Attorney, Agent, or Firm* — Steve Rosenblatt

(57) ABSTRACT

A connection between a shaft and a coupling that preferably involves involute shaped splines is designed to reduce stress from torque applied to the shaft by a drive motor. To avoid stress concentration at the mouth of the coupling on startup, the shaft splines are made to taper from the shaft end down to the spline end. As a result, the initial contact with the coupling splines occurs within the coupling and removed from it mouth. The shaft is allowed to elastically twist in response to the applied torque as the contact area increases with shaft twisting and the contact line moves toward the mouth of the coupling. Some shaft elastic twist occurs without adding stress to the shaft splines until coupling contact is made.

16 Claims, 4 Drawing Sheets

NON-PARALLEL SPLINED HUB AND SHAFT CONNECTION

FIELD OF THE INVENTION

The field of the invention is the connection between a shaft and a coupling and more particularly in the context of downhole equipment where the shaft is splined and the splines are configured for stress distribution.

BACKGROUND OF THE INVENTION

Equipment designed to fit in bore holes is, by nature, long and slim. Torsional loading of the shafts is often a limiting factor in the maximum power developed. Shaft connections are critical weak points in the shaft designs. The preferred choice for shaft connection in an Electrical Submersible Pump (ESP) is a spline, either a multi tooth involute, or six tooth square spline. Both have proved to be quick and reliable for field assembly of the equipment. Shaft material strength requirements for high power units can exceed 200,000 PSI yield. This is reaching the limits of readily available materials. To achieve these strength levels, elongation (ductility) has to be sacrificed. The selected materials are therefore more brittle and more susceptible to fatigue in the areas of high stress concentration.

The object of this invention is to reduce the high concentration of stress by making it possible to more uniformly distribute the forces involved along the spline. The problem of the spline joint is, when under load, the coupling which is stiffer will twist much less than the shaft. This is due to the difference in diameter. The angle of twist per unit length in a shaft varies directly as the applied torque, inversely as the modulus of shear and the forth power of the diameter. The coupling, even though it is a hollow cylinder, has to be extremely thin to match the angle of twist of the shaft. This is impractical because the coupling thickness is necessary to counter the radial forces that are attempting to expand (explode) the coupling. For example, if the shaft is 1" diameter and the coupling is 1.0" ID and 1.5" OD, the coupling is five times stiffer than the shaft. Under the same torque load, it will only have ⅕ of the twist as a shaft of the same length.

Examining failed shafts shows that almost the entire load is distributed over a short area where the end of the coupling engages the shaft spline. The length of this "work area" can only expand as the twist of the coupling allows more contact with the shaft and the local mashing (yielding) of the spline tooth itself. The solution to this situation in this invention is to shape the spline so that the initial contact area begins at the end of the shaft in the middle of the coupling. As the shaft twists in relation to the coupling, the contact area increases, the stress is spread over an increasing area, reducing the stress concentration at the initial contact location.

The coupling is formed by a pull broach, and it would be an extremely difficult operation to create a coupling spline that was wider at the start (mouth) of the coupling and taper as it progressed inward. The shaft spline is more easily modified. For a square tooth spline on which the sides of each tooth are parallel, the cutter would have to progress down the shaft with a slight twist angle to the axis of the shaft. It would also be necessary that the mating coupling spline tooth be cut wide enough to accommodate this twisted spline. A simpler arrangement could be made for the involute. These splines are generally made on a hobbing machine. The shaft is rotated and a rotating cutter, timed to cut the spline teeth progresses along the shaft from the end to the maximum design length of the spline. If the cutter plunges into the shaft material as it progress along the spline it will result in a tooth width that is wider at the end of the shaft and tapers as it moves into the spline. This will force the coupling to make first contact in the depth of the coupling and the contact area increases in the direction of the mouth of the coupling as the shaft material twists in relation to the coupling. The plunging cutter method will not work on a true square tooth form, but can be applied if the form is modified so that the shaft tooth tapers towards the OD of the shaft.

The present invention addresses stress concentrations that occur in a splined shaft that is involved with the transfer of torque with a coupling. This concentration is caused by the comparative rigidity of the female spline coupling which encompasses the male spline shaft. This difference in magnitude is sufficient to allow an assumption in the design that the female spline is rigid and all the torsional elastic displacement is concentrated in the shaft in a very narrow band of material at the intersection of the mouth of the coupling and shaft. As the mechanical limits of the equipment are pushed, stronger shaft materials are the option of choice. These metals obtain strength at the sacrifice of ductility and a heightened sensitivity to crack propagation reduction in fatigue resistance.

To lessen the burden on the shaft it is necessary to increase the area of the torsional contact beyond the narrow band. Increasing the compliance of the coupling by reducing its diameter is impractical because it increases the radial stress in the coupling from the radial component of the torque developed by the spline tooth. The coupling could fail from expansion (explosion). The possible solution is to have the axial tooth contact line designed so that as the torsion deforms the shaft elastically, the contact line becomes longer. This can be accomplished by changing form of the involute or square tooth so that it slightly spirals in the opposite direction of the torque loading in anticipation of the a elastic strain that occurs with loading. This is just marginally practical. Basically a large amount of tedious work is required for the benefit achieved. A simpler method of the present invention is to sacrifice a very small amount of shaft strength. This method requires that tooth form be developed so the tooth cutting hob plunges slightly towards the center of the shaft as the cut runs from the end of the shaft to its maximum length. The result is a "tapered tooth" wider at the end of the shaft which will first make contact with the coupling near its center and extends its contact line as the shaft deformation increases.

The following US Patents deal with the issue of splined shafts and couplings and the general design considerations that are involved in these designs but do not touch on the issue of stress distribution in such designs as addressed by the present invention: U.S. Pat. Nos. 3,073,134; 4,133,516; 4,331,006; 6,056,511; 6,120,261; 6,126,416; 6,332,841 and 6,709,234.

Those skilled in the art will gain a better understanding of the invention from the description of the preferred embodiment and associated drawings that appear below with an understanding that the full scope of the invention is given by the appended claims.

SUMMARY OF THE INVENTION

A connection between a shaft and a coupling that preferably involves involute shaped splines is designed to reduce stress from torque applied to the shaft by a drive motor. To avoid stress concentration at the mouth of the coupling on startup, the shaft splines are made to taper from the shaft end down to the spline end. As a result, the initial contact with the coupling splines occurs within the coupling and removed from it mouth. The shaft is allowed to elastically twist in response to the applied torque as the contact area increases with shaft twisting and the contact line moves toward the mouth of the coupling. Some shaft elastic twist occurs without adding stress to the shaft splines until coupling contact is made.

DETAILED DESCRIPTION OF THE PREFERRED EMBODIMENT

Figure 1:
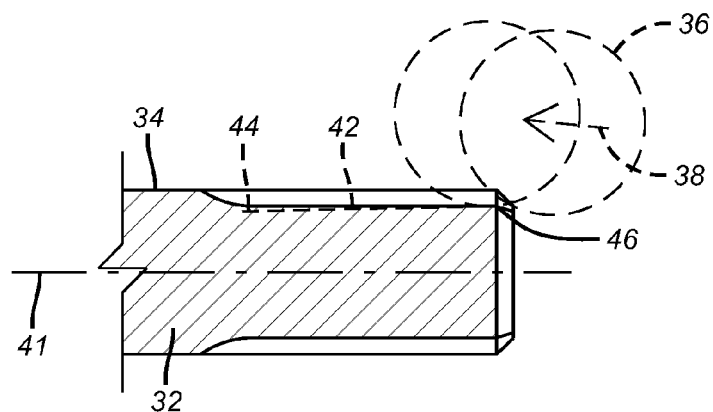
FIG. 1 is a section view of the path of a cutter making the shaft spline.
Figure 2:
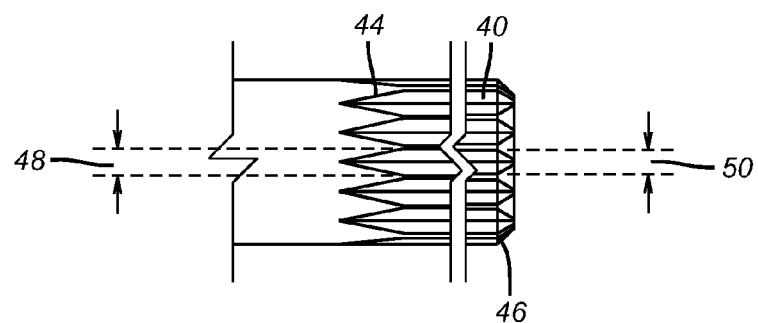
FIG. 2 is an elevation of the spline made in FIG. 1 showing it to be wider at the base near the motor end than at the shaft end.
Figure 3:
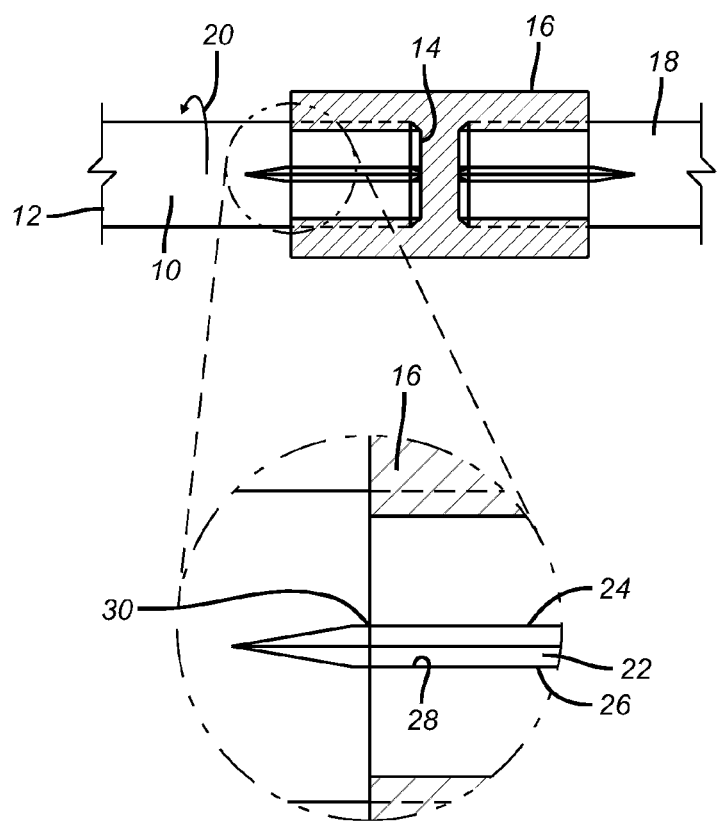
FIG. 3 shows an existing design of a splined coupling over the splined shaft and indicating how stress is concentrated at the mouth of the coupling.
Figure 5:
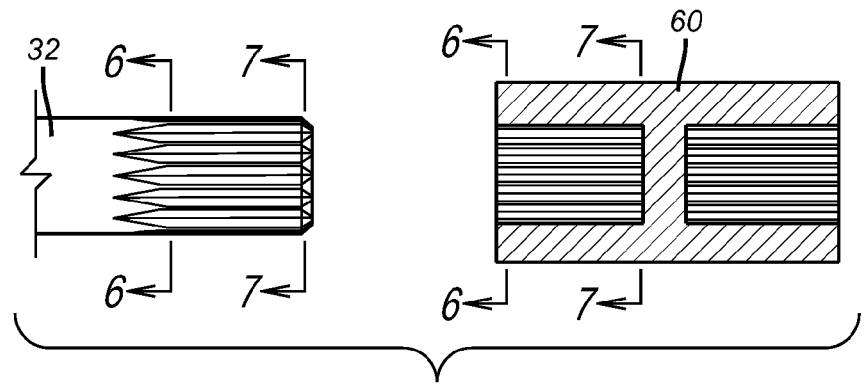
FIG. 5 shows the shaft end and the coupling before they are mated up.
Figure 6:
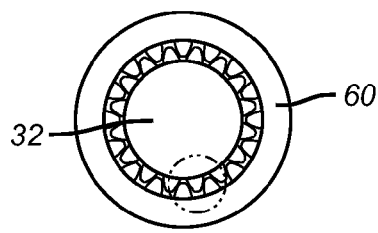
FIG. 6 is a view through lines 6-6 of FIG. 5 after the coupling is mounted to the shaft and showing the load and no load orientations.
Figure 7:
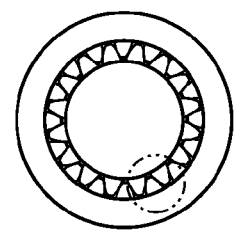
FIG. 7 is a view through lines 7-7 of FIG. 5 after the coupling is mounted to the shaft and showing the load and no load orientations.
Figure 6A:
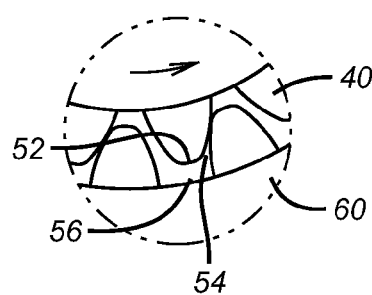
FIG. 6a is an enlargement of the dashed circle in FIG. 6.
Figure 7A:
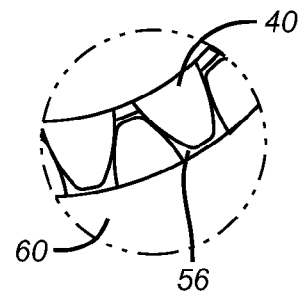
FIG. 7a is an enlargement of the dashed circle in FIG. 7.

The situation addressed by the present invention is shown in FIG. 3. Shaft 10 has a motor end 12 and a coupling end 14. A coupling 16 connects a driven shaft 18 to the driving shaft 10. Shaft 10 rotates in the direction of arrow 20. As shown in the enlarged view shaft male spline 22 (only one of which is shown for clarity) is preferably an involute shape in section having opposed base edges 24 and 26 that are parallel to each other. The female spline 28 has the same profile as spline 22. As a result, when the motor (not shown) is started and shaft 10 begins to turn, the maximum stress from the applied torque is located at the mouth 30 of the coupling 16 as indicated by the arrow pointing to the leading face of the spline 22 in the direction of rotation 20. This concentration of bending stress at the mouth 30 of the coupling can crack or fracture the splines 22 at the mouth 30 location of the coupling 16. The present invention seeks to reduce the degree of stress at the mouth 30 when torque is applied to the shaft 10 by configuring one of the shaft or coupling spline array in a way that initial spline contact is within the coupling 16 rather than at its mouth 30 and that as the shaft 10 elastically flexes under applied torque the contact area between shaft and coupling splines increases as the contact increases between the splines in a direction toward the mouth 30 of the coupling 16. Zone Name: B1,AMD FIGS. 1 and 2 show how this is done. While the process is illustrated in FIG. 1 on the shaft 32, those skilled in the art will appreciate that the spline configuration that brings the desired result can be cut into the coupling. It may be more economical to perform the procedure on the shaft outer surface 34 than inside the mating coupling (not shown). A cutter 36 is advanced in the direction of arrow 38 to cut the splines 40 which preferably have an involute shape in section but can be other shapes such as square or rectangular. The shaft 32 has a central axis 41 but the path of the cutter is along dashed line 42, which is not parallel to the axis 41 and will form an angle with axis 41. The width of the tooth is controlled by the depth of the cutter. As the cutter plunges, the depth may increase at a rate of 0.003" to 0.010" per inch of travel. This represents an angle to the shaft axis of about 0.15 to 0.5 degrees. The cut line 42 is closer to axis 41 at end 44 than at the shaft end 46. Since the involute shape is sloping or rounded, as better seen in FIGS. 6 and 7 each spline is wider at its base near end 44 as shown by dimension 48 than at the shaft end 46 as shown by dimension 50. While the height of the peak is constant, the slope of the cut line 42 means that the dimension from the centerline 41 of the shaft 32 to the spline base or root circle (shown in FIG. 6) is smaller near end than at shaft end 46. As a result, with no load applied, there is a gap 54 between the shaft splines 40 and the adjacent female coupling splines 56 at or near the mouth 58 of the coupling 60. On the other hand, near the shaft end 46 and where it winds up when the coupling 60 is assembled as represented by cutline 7-7 in FIG. 5, the section view in FIG. 7 shows that splines 41 on shaft 32 abut the female splines 56 on the coupling 60 with actual contact or a very much smaller gap than seen in FIG. 6 showing the same splines at the mouth 58 of the coupling 60.

Figure 4:
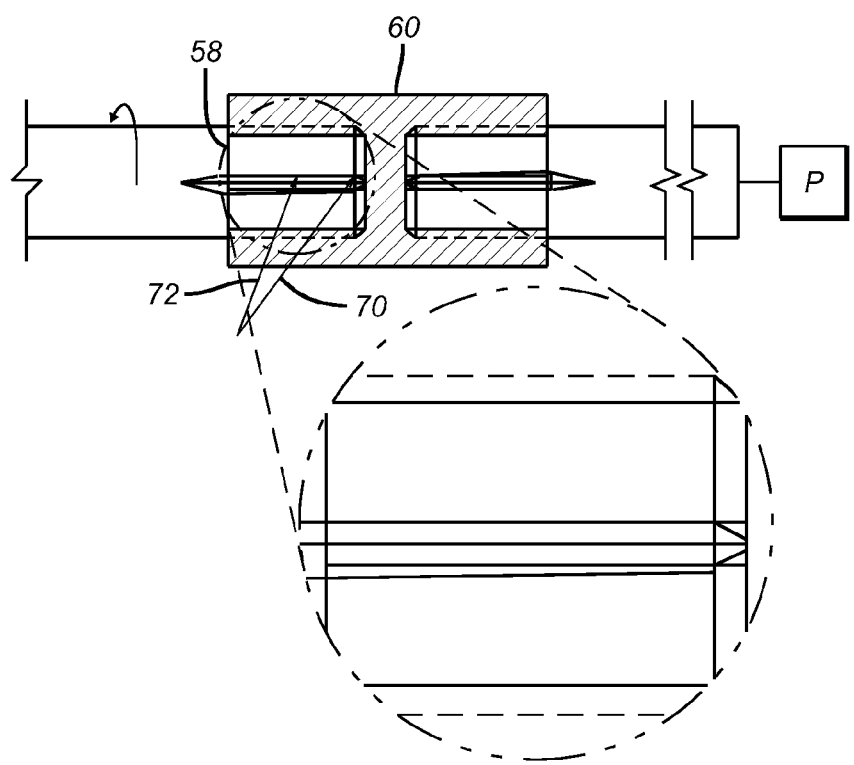
FIG. 4 is the present invention to be contrasted with FIG. 3 showing that the contact stress starts within the coupling and propagates toward the mouth of the coupling.

As a result when torque is applied to shaft 32 the initial stress is well within the coupling 60 as the contact of splines 40 and 56 starts there and as the shaft 32 twists in reaction to the applied torque the gap 54 closes in the direction toward the mouth 58 of the coupling 60. As the spline contact area increases due to elastic twist of the shaft 32 the contacted stress is reduced as the torque is transmitted over a progressively increasing contact area between the mating splines 40 and 56. In contrast to what happens in the FIG. 3 design and as best seen in the FIG. 4 the torque induced stress starts near arrow 70 and moves in the direction toward where arrow 72 is pointing. By the time spline contact at the mouth 58 occurs so that stress in the shaft splines 40 can build, there is already contact along the length of the shaft splines 40 with the coupling splines 56 along the length of splines 40 so that the initial stress at the mouth of the coupling as shown in FIG. 3 is greatly reduced in the FIG. 4 version. One reason for this is that parts of the shaft 32 has room to twist in response to applied torque without stressing the splines 40 at the mouth 58 of the coupling 60 because the elongated gap 54 that progressively closes as shaft 32 twists in response to applied torque. The initial stress that occurs where arrow 70 is pointing in FIG. 4 is well within the coupling 60 and is at a low enough level to reduce the risk of breaking the splines 40 at that location. One reason for this is that shaft 32 can continue to twist in the region where the gap 54 is closing to minimize spline stress until the gap 54 closes and stress can build. Ultimately, as shown at the bottom of FIG. 6 the gap 54 closes at the mouth 58 of the coupling 60 at a time when maximum meshing of the splines takes place to keep the stress level within the limits of the splines 40 so that they do not crack or shear at the mouth 58 as they might in the FIG. 3 embodiment, all other things being equal.

Those skilled in the art can now appreciate that cutting the splines on a shaft or the mating coupling at an angle to the central axis allows minimization of stress at the coupling mouth where in the past failures from torque induced stress on startup were most likely to occur. Instead, contact between the mating splines initiates within the coupling and spreads as the driven shaft twists and the spline contact area is increased. By the time the gap closes at the coupling mouth the stress level on the driven shaft splines is reduced. The applied toque induces an elastic twist in the driven shaft that places progressively more splines in a meshing relation while sparing the shaft spline at the mouth of the coupling from being immediately stressed as in the past with the FIG. 3 design. The outer dimension of the male spline on the driven shaft is smaller at the motor driver end because of the slant of line of cut 42 and that slant cut allows the gap 54 to be created so that progressively larger contact area between splines can occur as the driven shaft can twist in response to applied torque while avoiding rapid stress buildup at the coupling mouth as happened in the past when the splines were not slant cut with respect to the central axes of the shaft and the coupling. While the preferred application is in downhole use in electric submersible pumps schematically shown in FIG. 4 as P, other applications are envisioned not limited to downhole applications.

The above description is illustrative of the preferred embodiment and many modifications may be made by those skilled in the art without departing from the invention whose scope is to be determined from the literal and equivalent scope of the claims below.

We claim:

1. A connection between a shaft and a coupling, comprising:
    a shaft having a first end and a second end opposite said first end, wherein shaft splines are formed around an outer periphery of said shaft, said shaft splines being formed between longitudinally extending shaft grooves cut into an outer surface of said shaft;
    a coupling comprising an opening adapted to receive said shaft, said opening extending from a first end formed within said coupling to a second end formed at an outer surface of said coupling, wherein coupling splines are formed around an inner periphery of said opening, said coupling splines being formed between longitudinally extending coupling grooves cut into an inner surface of said opening, and wherein said shaft is inserted into said opening such that said first end of said shaft is located adjacent said first end of said opening, and said shaft splines are engaged with said coupling splines;
    wherein said coupling and said shaft are rotatable about a common central axis for torque transmission therebetween through said respective engaged splines and where one of said shaft grooves and said coupling grooves are cut in a manner that the width of each groove and the depth of cut of each groove with respect to said common central axis changes between the respective first and second ends thereof, while a major diameter of said splines formed between said one of said shaft grooves and said coupling grooves is substantially constant such that:
    when no rotational load is applied to the shaft, the shaft splines and coupling splines contact only at the respective first ends thereof, while
    when a rotational load is applied to the shaft spline contact area between said shaft splines and said coupling splines increases toward said second end of the coupling as said shaft deflects under loading.

2. The connection of claim 1, wherein:
    said coupling defines a mouth where said shaft enters said coupling and an initial gap is defined at said mouth between adjacent shaft and coupling splines when no load is applied to said shaft.

3. The connection of claim 2, wherein: when a rotational load is applied to the shaft, said gap closes in a direction from within said coupling toward said mouth.

4. The connection of claim 3, wherein: said shaft splines and said coupling splines are involute shaped in section.

5. The connection of claim 4, wherein:
    said shaft and coupling splines make initial no load contact within said coupling while also being spaced apart at another location within said coupling.

6. The connection of claim 5, wherein:
    said shaft and coupling splines make more contact as shaft load is applied and said shaft twists elastically to reduce the spacing between them present when no load is applied.

7. The connection of claim 6, wherein: said gap closes last at said mouth as torque to said shaft is applied; and said shaft grooves have a base adjacent said second end of said shaft where said base is wider near said mouth than within said coupling.

8. The connection of claim 7, wherein: a radial height of said shaft splines at said first end of said shaft is greater than a radial height of said shaft splines at said mouth; and further comprising an electric submersible pump driven by said shaft and coupling.

9. The connection of claim 2, wherein:
    said gap closes last at said mouth as torque to said shaft is applied.

10. The connection of claim 2, wherein: said shaft grooves have a base adjacent said second end of said shaft where said base is wider near said mouth than within said coupling.

11. The connection of claim 1, wherein: said one of said shaft grooves and said coupling grooves is cut on an axis, wherein said axis is non-parallel with said common central axis.

12. The connection of claim 11, wherein: said axis is about 15 to 0.5 degrees askew from said common central axis.

13. The connection of claim 1, wherein:
    said shaft and coupling splines are involute shaped in section.

14. The connection of claim 1, wherein:
    said shaft and coupling splines make initial no load contact within said coupling while also being spaced apart at another location within said coupling.

15. The connection of claim 14, wherein:
    said shaft and coupling splines make more contact as shaft load is applied and said shaft twists elastically to reduce the spacing between them present when no load is applied.

16. The connection of claim 1, further comprising:
    an electric submersible pump driven by said shaft and coupling.

* * * * *